(12) United States Patent
Raymond et al.

(10) Patent No.: US 7,698,959 B2
(45) Date of Patent: Apr. 20, 2010

(54) TORQUE MEASUREMENT DEVICE FOR MEASURING TORQUE ON ROTATABLE SHAFTS AT HIGH SPEEDS

(75) Inventors: Steve Raymond, Troy, MI (US); Douglas Baker, Ann Arbor, MI (US)

(73) Assignee: Micro-Poise Measurement Systems, LLC, Akron, OH (US)

( * ) Notice: Subject to any disclaimer, the term of this patent is extended or adjusted under 35 U.S.C. 154(b) by 61 days.

(21) Appl. No.: 12/098,740

(22) Filed: Apr. 7, 2008

(65) Prior Publication Data

US 2009/0249892 A1     Oct. 8, 2009

(51) Int. Cl.
*G01L 3/00* (2006.01)
(52) U.S. Cl. .................................. 73/862.08
(58) Field of Classification Search ...............
73/862.08–862.195
See application file for complete search history.

(56) References Cited

U.S. PATENT DOCUMENTS

| 5,140,849 | A | * | 8/1992 | Fujita et al. | ............... 73/593 |
| 5,705,757 | A | * | 1/1998 | Wozniak | ............ 73/862.338 |
| 7,081,693 | B2 | * | 7/2006 | Hamel et al. | ............... 307/151 |
| 7,256,505 | B2 | * | 8/2007 | Arms et al. | ............... 290/1 R |

* cited by examiner

*Primary Examiner*—Max Noori
(74) *Attorney, Agent, or Firm*—Tarolli, Sundheim, Covell & Tummino LLP

(57) ABSTRACT

A torque measuring device for measuring the torque of a rotatable shaft. A sensing unit senses the torque on the rotatable shaft. The sensing unit is disposed on the outer surface of the rotatable shaft. A reporting unit is configured to report the torque applied to the rotatable shaft to a central control unit. The reporting unit is mounted at an end of the rotatable shaft.

20 Claims, 6 Drawing Sheets

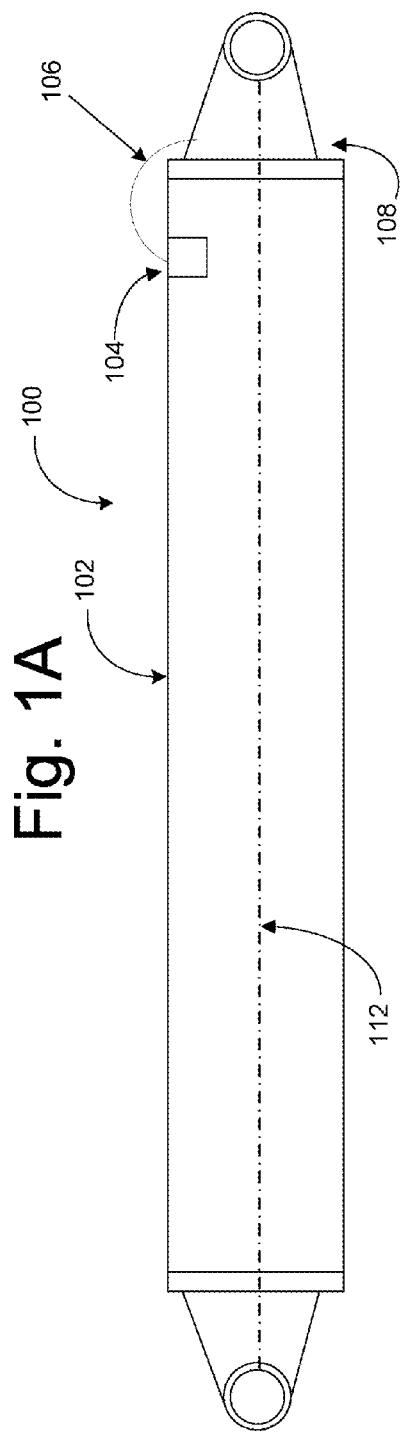
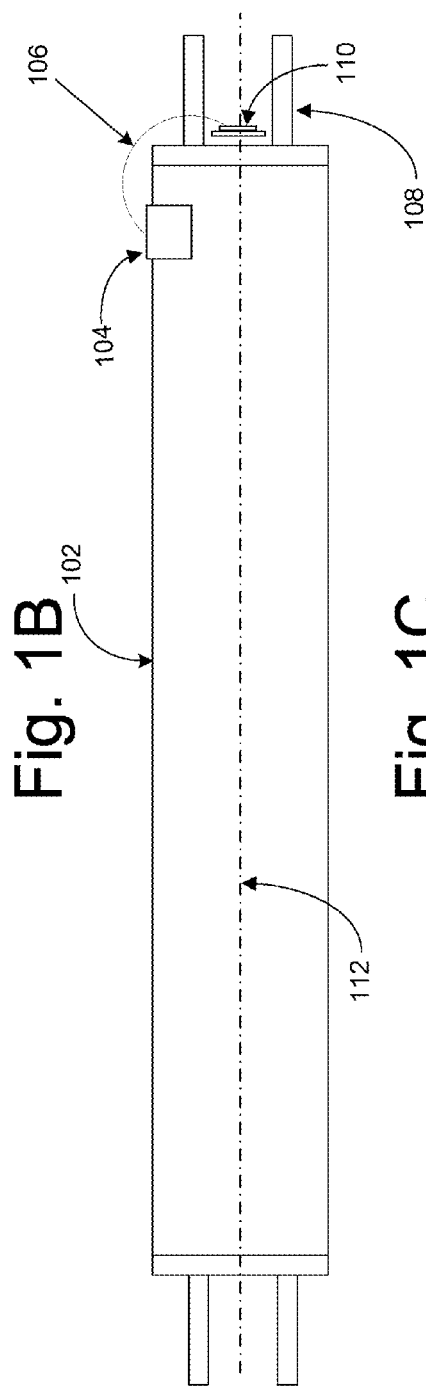
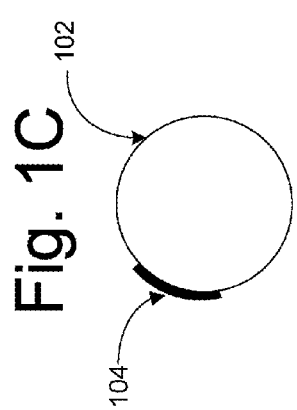

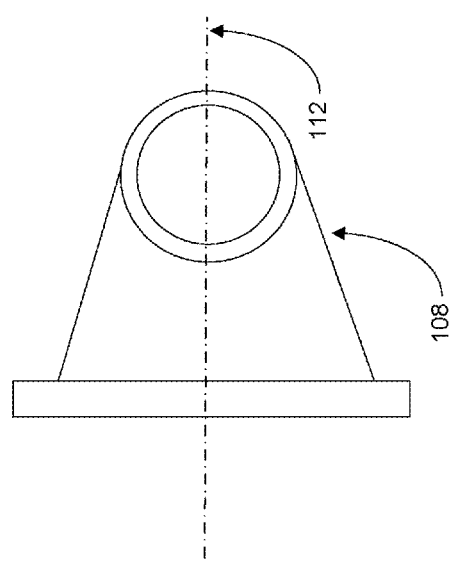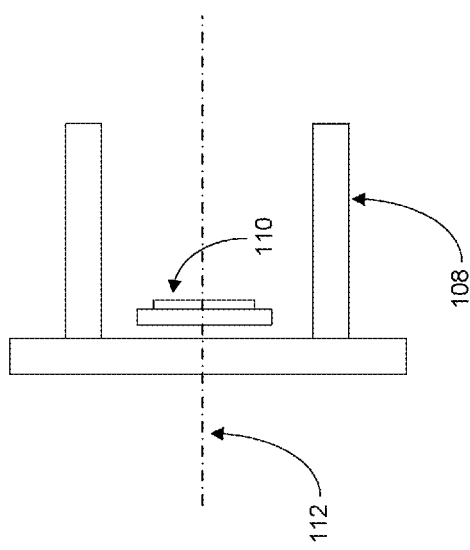

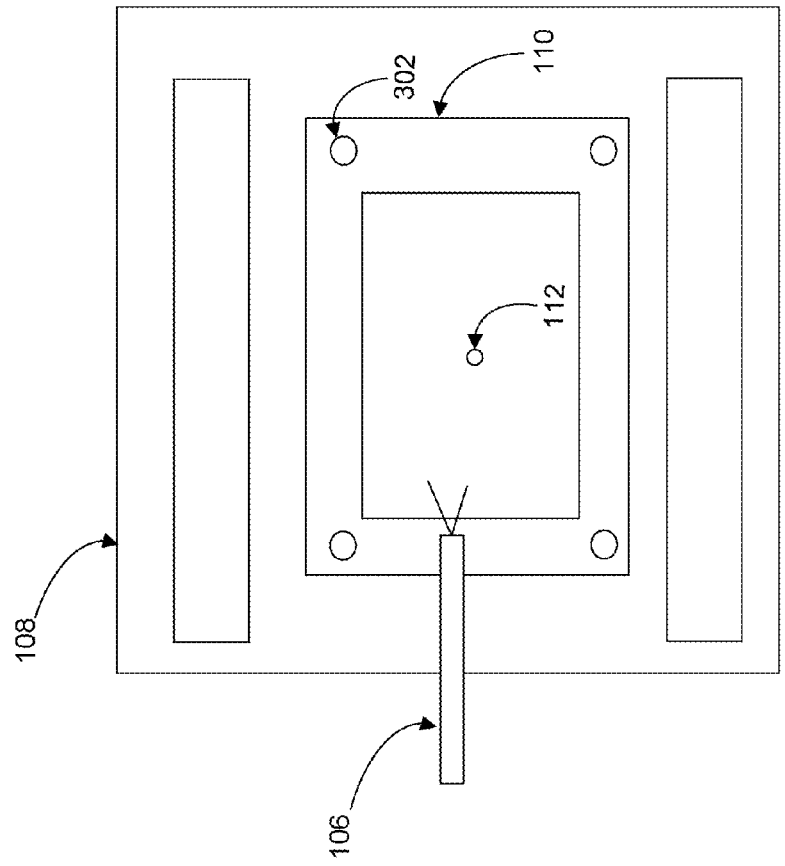

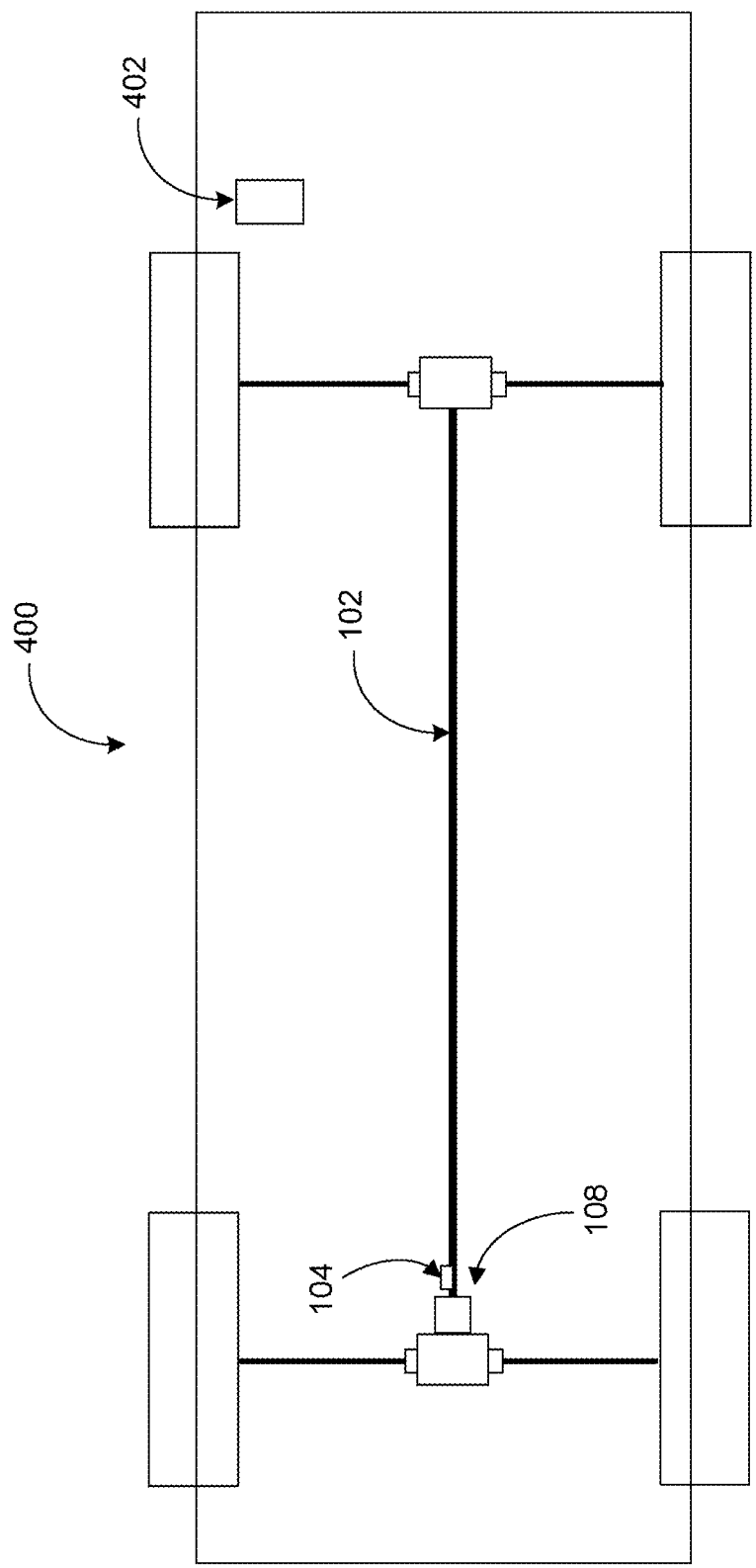

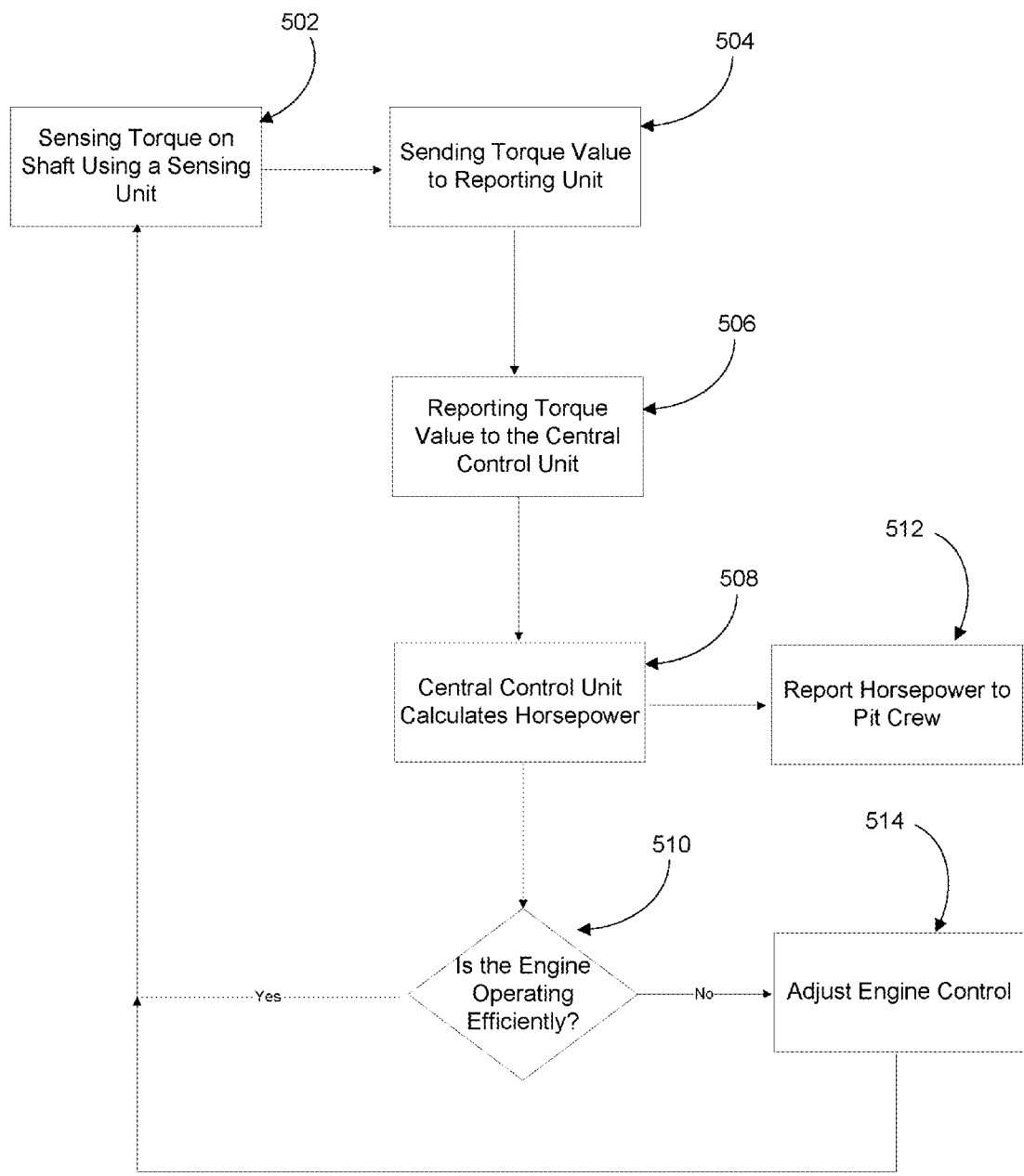

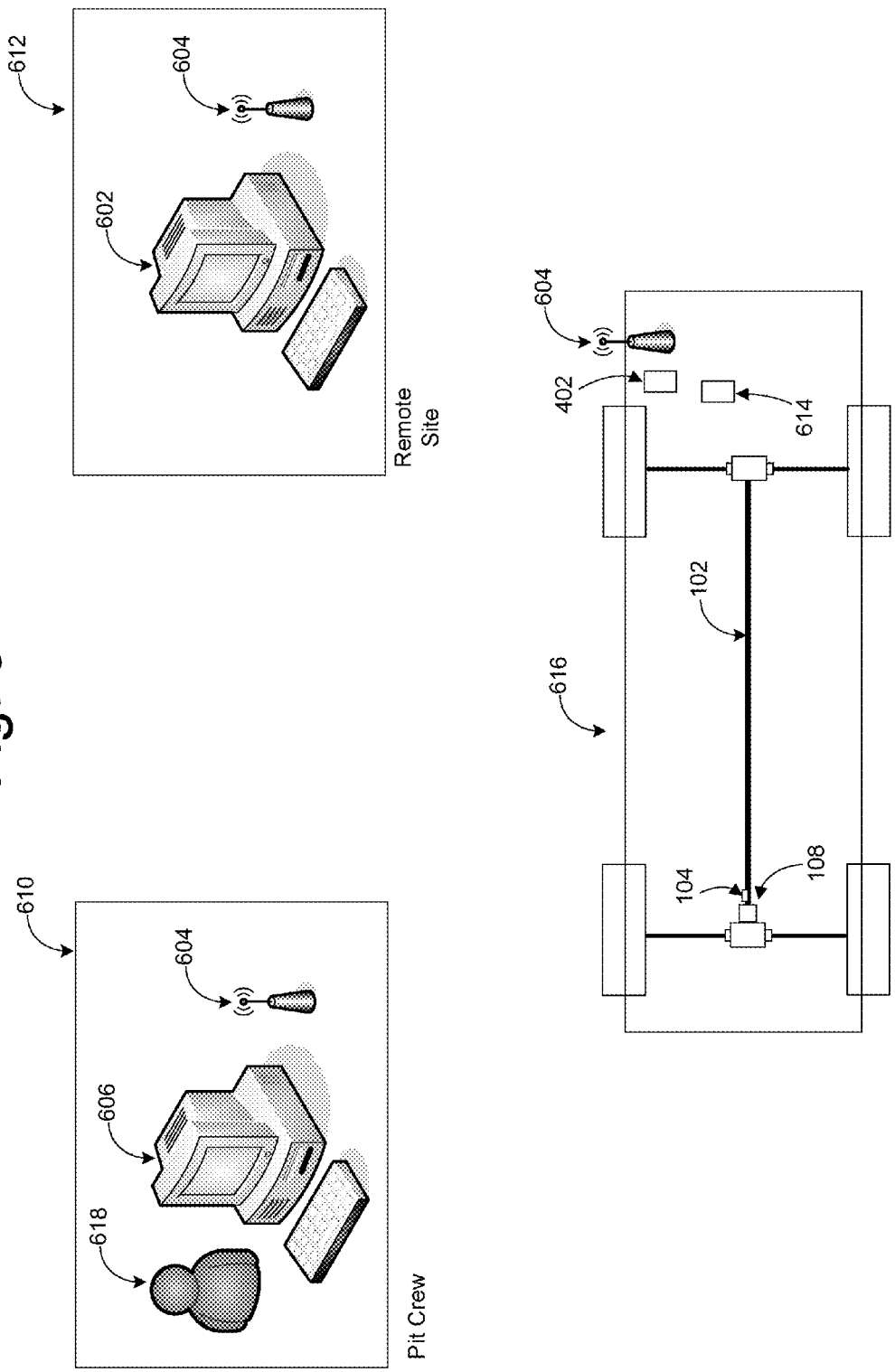

TORQUE MEASUREMENT DEVICE FOR MEASURING TORQUE ON ROTATABLE SHAFTS AT HIGH SPEEDS

FIELD OF THE INVENTION AND BACKGROUND OF THE INVENTION

The present invention generally relates to measuring the torque on a rotatable shaft and more particularly to non-intrusively measuring the torque on a shaft at high rotational speeds.

Historically, torque measuring for vehicles has been performed using a dynamometer in a laboratory setting. A dynamometer is used to determine the amount of horsepower an engine generates. A dynamometer includes an engine under test, a drive shaft and a torque measuring sensor. The engine is run under an artificial load, and the torque sensor measures the amount of torque the drive shaft is subjected to while the engine is operated at a constant speed. Since engine horsepower is equal to the torque times the rotational speed of the engine, if the engine is held to a constant rotational speed, the amount of torque can be measured and the amount of horsepower the engine generates can be obtained. Once the amount of horsepower is determined, adjustments to the control of the engine can be made to increase the amount of horsepower generated.

Conventional methods and apparatus for measuring torque in real time on a vehicle involve mounting large invasive devices on the drive shaft of the vehicle to determine the amount of torque generated by the engine. However, because these devices are invasive, they negatively effect the performance of a vehicle using the device by adding mass, increasing the tire path of the vehicle, and changing the center of gravity of the vehicle. As a result, with conventional technology the benefit of controlling engine performance using actual horsepower generated is outweighed by the additional weight and performance restrictions created by the conventional torque measuring devices.

In high performance automobiles in particular, adjustment of engine control in real time to produce the maximum amount of horsepower from the vehicle's engine is beneficial. However, the conventional sensors are limited to engine speeds less than 5,000 rotations per minute (RPM) because the sensing devices become separated from the driveshaft due to the extreme torque experienced at higher engine speeds. Since high performance automobiles operate at engine speeds of 5,000 RPM and higher, conventional sensing devices are not capable of providing real time sensing of torque. Additionally, as stated above, the conventional torque sensors are intrusive and negatively effect the performance of the engine due to their position on the driveshaft. This becomes amplified in high performance vehicles which are more susceptible to variations in weight and other performance modifications. As a result, a need exists to provide a torque sensor capable or withstanding engine speeds at high RPMs and that does not effect the performance of the vehicle.

SUMMARY OF THE INVENTION

Methods and systems consistent with the present invention non-intrusively measure torque on a rotating shaft. In one embodiment of the present invention, a torque measuring device measures the torque of a rotatable shaft having an outer lateral surface. The torque measuring device comprises a sensing unit that senses the torque on the rotatable shaft with the sensing unit being disposed outwardly from the outer surface of the rotatable shaft and a reporting unit mounted at an end of the rotatable shaft configured to report the torque applied to the rotatable shaft to a central control unit. In a particular embodiment, the torque measuring device also includes a lead wire which electrically couples the sensing unit with the reporting unit. The lead wire and the sensing unit may be covered in a protective film to prevent damage while operating. In another embodiment, the torque measuring device includes a sensing unit which is a torque sensor or strain gage. In yet another embodiment, the lead wires between the reporting unit and the sensing unit are covered in fiberglass where the fiberglass prevents the destruction of the sensing unit and lead wires when engine speeds are 5,000 RPM or greater.

In yet another embodiment, a method of non-intrusively measuring the torque in a rotatable shaft is provided that comprises the steps of sensing the torque on the rotatable shaft using a sensing unit disposed outwardly from the outer surface of the rotatable shaft, and reporting the torque applied to the rotatable shaft to a central control unit using a reporting unit mounted at an end of the rotatable shaft and electrically coupled by at least one lead wire to the sensing unit.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings:

FIGS. 1A, 1B and 1C are schematics illustrating one embodiment of a torque measuring system connected to a rotatable shaft.

FIGS. 2A and 2B are schematics illustrating one embodiment of the mounting of a reporting unit on one end of a rotatable shaft.

FIG. 3 is a schematic illustrating details of one embodiment of the mounting of a reporting unit on end of a rotatable shaft.

FIG. 4 is a schematic illustrating one embodiment of a central control unit in a vehicle.

FIG. 5 is a flow diagram illustrating one embodiment of the torque measurement process.

FIG. 6 is a schematic illustrating one embodiment of the reporting and data transmission process.

DETAILED DESCRIPTION OF THE INVENTION

Reference will now be made in detail to an implementation consistent with the present invention as illustrated in the accompanying drawings. Wherever possible, the same reference numbers will be used throughout the drawings and the following description to refer to the same or like parts.

FIGS. 1A and 1B are schematics illustrating one embodiment of a torque measuring system 100 mounted on a rotatable shaft 102. FIG. 1C shows a example of a sensing unit 104 disposed outwardly from the outer surface of the rotatable shaft 102. In one embodiment, the outer surface may be circumferential, e.g., for a rotatable shaft 102 with a circular cross-section. In the illustrated embodiment, a lead wire 106 connects the sensing unit 104 to a reporting unit 110. The reporting unit 110 is positioned on a weld yoke 108 such that the center of the reporting unit 110 rotates around the axial center of rotation 112 of the shaft 102.

In one embodiment, the sensing unit 104 may include, but is not limited to, one of a strain gage, torque sensor, pressure sensor, or other force measuring device. The sensing unit 104 may be mounted to the outer surface of the shaft 102 using an adhesive. For illustrative purposes, a strain gage type sensing unit 104 will be described.

In the illustrated embodiment, the lead wires 106 electrically connect the sensing unit 104 to the reporting unit 110 located on weld yoke 108 at the end of the shaft. The lead wires 106 connect to terminals on the sensing unit 104 and to terminals located on the reporting unit 110. The sensing unit 104 sends electrical information pertaining to the amount of torque the shaft is experiencing. For example, a strain gage type sensing unit 104 will send information pertaining to the amount of torque, measured by the strain gage, the shaft is experiencing to the reporting unit 110 (e.g. 4-20 ma, 0-10V). In another embodiment, an optical, wireless or alternative electrical interface may be utilized to communicate sensed data from the sensing unit 104 to the reporting unit 110.

While one sensing unit 104 is shown, multiple sensing units may be used to measure the torque at different points on the shaft 102. Using multiple sensing units 104 allows the reporting unit 110 to calculate an average torque throughout the shaft 102. In addition, individual torque readings gathered by the reporting unit 110 can provide insights into the operation of the shaft 102 in real time. In one embodiment of the present invention, multiple sensing units 104 are wired together in series to provide a single average input into the reporting unit 110. In another embodiment, each sensing unit 104 disposed on the shaft 102 sends an individual signal to the reporting unit 110 which can be used to calculate the stress profile across the entire shaft in real time. Devices that receive, for example, a strain gage signal and convert that signal into a different type of signal are known in the art and will be described in detail herein.

In one embodiment of the present invention, a protective material may be formed over the lead wires 106 and sensing unit 104. The protective material protects the lead wires 106 and the sensing unit 104 and prevents separation of the sensing unit 104 from the shaft 102 during high engine speeds (such as speeds approaching or exceeding 5,000 RPM, for example.

In one embodiment the protective material is made of fiberglass and may include, but is not limited to, 45×45 S-Glass West Systems Pro-set Epoxy part A (Resin 145-00), B Hardener 226-00 used to apply fiberglass over the sensing unit 204 and around the shaft 102, DenaTite AV 138 High Temperature Resin and HV 998 High Temperature Hardener which is used to hold the lead wires 106 to shaft 102, and/or Peel Ply Dacron Fabric which is used to smooth fiberglass wrap and improve thickness consistence.

By providing the protective covering over the lead wires 106 and the sensing unit 104, the torque sensor can physically survive excessive engine speeds. As a result, the torque system is well suited for use in racing vehicles having high operating engine speeds.

FIGS. 2A and 2B are schematics illustrating the mounting of reporting unit 110 on one end of the rotatable shaft 102. The reporting unit 110 is located on the weld yoke 108 such that the center of rotation of the reporting unit 110 is aligned with the axial center of rotation 112 of the shaft 102. Aligning the reporting unit 110 in this manner ensures the safe operation of the reporting unit 110 and prevents the reporting unit 110 from interfering with the operation of the shaft 102.

Additionally, by providing the reporting unit 110 on the end of the shaft 102, any inertial effects of mounting the reporting unit 110 on the shaft 102 are minimized. The size and weight of the shaft 102 are also minimally impacted, further reducing any performance deterioration resulting from to the use of the torque monitoring system 100. Because the forces at the end of the shaft 102 are relatively low compared to the stresses on the outer lateral surface of the shaft 102, the reporting unit will also tolerate high engine speeds.

FIG. 3 shows further detail concerning embodiments of the mounting of the reporting unit 110. In one embodiment, consistent with the present invention, the reporting unit 110 is mounted on the end of the shaft and is secured using four screws 302 which recess into the weld yoke 108. The lead wires 106 connect into connection points, such as solder joints or terminals, on the reporting unit 110. The reporting unit 110 receives information pertaining to the torque applied to the shaft 102 from the sensing unit 103 and sends this information to a central control unit 402 (shown in FIG. 4) remotely located from the reporting unit 110. The reporting unit 110 is capable of communicating with the central control unit 402 over a network which may include wireless and wired branches.

A method for non-intrusively measuring torque will now be described with reference to FIGS. 1A, 1B, 1C 4 and 5. First, the torque on the rotating shaft 102 is sensed using a sensing unit 104 which is positioned about the outer lateral surface of the shaft 102 (step 502). The sensing unit 104 is capable of measuring the torque applied to a shaft 102 by measuring strain, pressure, or any other attribute which indicates the amount of torque the shaft is experiencing. The sensing unit 104 translates the torque applied on the shaft 102 into an electrical signal which is sent to a reporting unit 110 via lead wires 106. (step 504).

Next, the reporting unit 110, mounted on the end of the shaft 102 and connected to the sensing unit 104 by the lead wires 106, receives the torque applied to the shaft 102 from the sensing unit 104 and reports that value to a central control unit 402. (step 506). The reporting unit 110 is configured to convert the analog signal (e.g. 4-20 ma, 0-10V) received from the sensing unit 104 into data which can be used to calculate engine horsepower by the central control unit 402. The reporting unit 110 sends the data representing the analog signal from the sensing unit 104 to the central control unit 402 over the communication network 604 or using an analog signal.

In one embodiment, the reporting unit is a TECAT Torque Telemetry Transmitter ("Transmitter") which includes a wireless Radio Frequency ("RF") transmitter, a battery for local power, a strain gage sensor input and a 16 bit sensor resolution at a data rate of up to 500 Hz. The Transmitter uses an open communications protocol, such as Controller Area Network ("CAN"), to send real time strain readings to a central control unit 402 or a remote server or terminal unit 602 (shown in FIG. 6). The Transmitter includes a wireless RF antenna which is configured to send information pertaining to the torque on the shaft 102 to the central control unit 402.

Once the central control unit 402 receives the information from the reporting unit 110, the central control unit 402 calculates the actual horsepower generated by the engine in real time. (step 508). Horsepower is calculated using the following equation:

$$\text{Horsepower} = [\text{Torque} * \text{Rotations per Minute (RPM)}] / 5252$$

The torque value is the signal sensed by the sensing unit 104 and sent to the central control unit 402 from the reporting unit 110. The RPM reading is provided to the central control unit 402 from a separate source not disclosed herein.

Once the horsepower is calculated, the central control unit 402 sends the horsepower information to a external location, such as a pit crew 610. (step 512). At the same time, the central control unit 402 uses the calculated horsepower to determine how efficiently the engine is operating. (step 510). If the engine is operating below a identified horsepower threshold, the central control unit 402 adjusts the engine control sequence to increase the amount of horsepower generated by the engine. (step 514). For example, if the horsepower is below 500 HP the CPU may adjust the air to fuel ratio in the engine to produce more horsepower. By adjusting the control sequences of the engine, the amount of horsepower generated by the engine is increased. As a result, the engine will operate at the maximum possible horsepower. The central control unit 402 may also initiate an alarm if the engine is not running at its most efficient level. If the engine drops below a minimum performance threshold, the central control unit 402 may generate another alarm indicating an engine problem.

In an illustrative embodiment, as shown in FIG. 6, the torque sensor 100 is applied to a high performance race car 616 which operates at high engine speeds. By sensing the torque on the driveshaft of the vehicle in real time and sending the information back to a central control unit 402 via the reporting unit 110, the operation of the car 616 may be adjusted such that the maximum amount of horsepower is consistently produced.

Once horsepower is calculated by the central control unit 402, further analysis and reporting may be provided. For example, the central control unit 402 may report the real time horsepower generated by the race car 616 to the diver via a display unit 614. Also, the central control unit 402 may transmit the engine horsepower information to a pit crew 610 via a wireless network 604. By sending real time engine information over a wireless network 604 to a terminal unit 606 located in the pit 618, the pit crew 618 may make adjusts to the car 616 during the next pit stop based on the information sent from the central control unit 402. The pit crew 618 may also send commands to the central control unit 402 over the wireless network 604 to make adjustments to the operational sequences of the engine in real time or notify the driver of operational changes which could impact the performance of the race car 616.

In another embodiment, the central control unit 402 may send engine performance information, including horsepower, to a central server or terminal 602 via a wireless network 604. The central server or terminal unit 602 may store the engine performance information for later analysis, issue alerts if the engine performance falls below a specific threshold, send parts to the pit crew 618 for modifications during the next pit stop, or send real time data to the pit crew 618, driver or another remote site for further analysis. Once the information is stored on the central server or terminal 602, the information may be logged to produce time based reports displaying the performance of the car 616 during operation. For example, the central server or terminal 602 may log the engine horsepower, RPM, fuel usage, vehicle speed and lap time to determine the conditions which produced the fastest lap time. The information logged by the server or terminal 602 is not limited to the engine readings listed, as any information pertaining to engine performance collected by the central control unit 402 may be logged and used for analysis after the car 616 has stopped operating. Because the torque sensor is non-intrusive to the shaft, the impact on performance of the car is minimal. Therefore, the logged data will indicate true engine performance without any encumbrances caused by measuring torque in real time.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A torque measuring device for measuring the torque of a rotatable shaft having an outer surface comprising:
   a sensing unit that senses the torque on the rotatable shaft, the sensing unit being disposed outwardly from the outer surface of the rotatable shaft; and
   a reporting unit in communication with the sensing unit and mounted at an end of the rotatable shaft such that the reporting unit intersects the axial center of rotation of the rotatable shaft, the reporting unit configured to communicate the torque to a central control unit.

2. The torque measuring device of claim 1 wherein,
   the reporting unit is electrically coupled by a lead wire to the sensing unit, and
   the lead wire and the sensing unit are encased in a protective film.

3. The torque measuring device of claim 1, wherein,
   the sensing unit is one of a strain gauge and torque sensor.

4. The torque measuring device of claim 2, wherein
   the protective film comprises fiberglass.

5. The torque measuring device of claim 1 wherein,
   at least two sensing units are disposed outwardly from the outer surface of the rotatable shaft, and
   the sensing units each individually communicate with the reporting unit.

6. The torque measuring device of claim 1 wherein,
   at least two sensing units are disposed outwardly from the outer surface of the rotatable shaft, and
   the sensing units are electrically coupled such that the reporting unit receives the average torque across the rotatable shaft.

7. The torque measuring device of claim 1 wherein,
   the central control unit is configured to adjust an engine control sequence such that the amount of horsepower increases.

8. A method of measuring torque on a rotatable shaft, the method further comprising the steps of:
   sensing the torque on the rotatable shaft using a sensing unit positioned on a surface of the rotatable shaft; and
   reporting the torque applied to the rotatable shaft to a central control unit using a reporting unit mounted at an end of the rotatable shaft such that the reporting unit intersects the axial center of rotation of the rotatable shaft.

9. The method of claim 8, wherein sensing the torque further comprises:
   detecting a change in the electrical properties of at least one portion of the sensing unit; and
   determining a torque in response to the detected change.

10. The torque measuring device of claim 8 wherein
    the sensing unit and lead wires are covered with a protective film comprised of fiberglass.

11. The method of claim 8 further comprising the step of:
    electrically coupling at least two sensing units to the reporting unit such that the reporting unit receives the average torque across the rotatable shaft.

12. The method of claim 8 further comprising the steps of:

electrically coupling each of the at least two sensing units individually to the reporting unit that the reporting unit receives a separate signal for each unit, and calculating the average torque across the rotatable shaft in the reporting unit based on the separate signals received from the sensing units.

13. The method of claim 8 further comprising the step of:

calculating the horsepower of the rotatable shaft; and adjusting an engine control sequence to produce more horsepower when the horsepower as calculated by the central control unit is below a threshold value.

14. A method of collecting engine power generation in a race car in real time, the method comprising:

sensing the torque on a rotatable shaft using a sensing unit positioned on an outer surface of the rotatable shaft; and communicating the torque to a central control unit using a reporting unit mounted at an end of the rotatable shaft such that the reporting unit intersects the axial center of rotation of the rotatable shaft.

15. The method of claim 14, wherein sensing the torque comprises determining a change in an electrical property of the sensing unit and wherein the reporting unit converts such determined change into a signal representative of the torque.

16. The method of claim 14 wherein the reporting unit communicates the torque to the central control unit by one of a wireless network, wired network, and an analog signal.

17. The method of claim 14 further comprising the step of electrically coupling at least two sensing units to the reporting unit such that the reporting unit receives the average torque across the rotatable shaft.

18. The method of claim 17 further comprising the steps of electrically coupling each of the at least two sensing units individually to the reporting unit such that the reporting unit receives a separate signal for each unit, and calculating the average torque across the rotatable shaft in the reporting unit based on the separate signals received from the sensing units.

19. The method of claim 14 further comprising the step of:

calculating the horsepower of the rotatable shaft; and adjusting an engine control sequence to produce more horsepower when a horsepower as calculated by the central control unit is below a threshold value.

20. The method of claim 14 further comprising displaying information associated with the performance of an engine of the race car in response to receiving the communicated torque.

* * * * *